United States Patent [19]

Durgin

[11] Patent Number: 4,747,175
[45] Date of Patent: May 31, 1988

[54] FROST AND ICE SCRAPER

[76] Inventor: Robert D. Durgin, 13821 Artic Ave., Rockville, Md. 20853

[21] Appl. No.: 74,026

[22] Filed: Jul. 16, 1987

[51] Int. Cl.⁴ .............................................. A47L 1/08
[52] U.S. Cl. .................................. 15/105; 15/236 R; 15/245
[58] Field of Search ...................... 15/105, 245, 236 R, 15/118, 121

[56] References Cited

U.S. PATENT DOCUMENTS

| | | | |
|---|---|---|---|
| 2,242,992 | 5/1941 | Devor | 15/105 X |
| 2,719,316 | 10/1955 | Hauser | 15/105 X |
| 3,274,684 | 9/1966 | Marks | 15/105 X |
| 4,124,915 | 11/1978 | Schlicher | 15/105 |
| 4,281,433 | 8/1981 | Sendoykas | 15/105 |
| 4,324,018 | 4/1982 | Olsson | 15/105 X |

Primary Examiner—Chris K. Moore
Attorney, Agent, or Firm—Richard C. Litman

[57] ABSTRACT

An ice scraper includes a unitary body having opposite alternate scraping edges to facilitate the removal of frost, ice, and snow from automobile windows. The device is also equipped with a contoured hand grip edge and an opposed squeegee edge. One scraping edge is fixed and provides both a straight and contoured edge while the alternate scraping edge includes a plurality of deflectable fingers angularly offset from the plane of the body. Optional features provide hanging and storing provisions including a fabric loop fastener, such as VELCRO, for attachment to the carpet of a vehicle.

9 Claims, 1 Drawing Sheet

FROST AND ICE SCRAPER

BACKGROUND OF INVENTION

1. Field of Invention

Devices are available in a number of forms for removing ice and snow from the surfaces of automobile windows. The present invention relates to scrapers in general, more specifically to ice scrapers, but especially to an improved method for removing frost, ice, and snow from the surfaces of curved automobile windows. The invention further provides for the removal of excess water, sleet, mud and similar obscurants from automobile windows. The invention is directed at the improvement of the removal of frost from curved windows, which requires a contoured, continuous edge. While the invention is particularly suited for use on automobile windows, it will serve equally well on the windshields of other vehicles or on any surface requiring the removal of frost, ice, water and similar obscurants. In addition, the invention is made of materials that will enable the user to operate it comfortably and easily even in very low temperatures. The invention can be used for a variety of scraper products in a number of different embodiments, the method and construction of which are more fully described below.

2. Description of the Prior Art

A number of ice scraper devices and the like are known and are found to be exemplary of the U.S. prior art. They are:

| U.S. Pat. No. | Inventor |
|---|---|
| 3,816,863 | Thielemann, Jr. |
| 4,141,111 | Hopkins, et. al. |
| 4,164,801 | Thomas |
| 4,275,476 | Hopkins, et. al. |

In the patent to Thielemann, Jr. (U.S. Pat. No. 3,816,863) there is described a device that functions as a screwdriver and a scraper, having a flat plastic edge for use in scraping.

The first patent to Hopkins, et. al. (U.S. Pat. No. 4,141,111) is a continuation of U.S. Pat. No. 4,040,140, in which a single-piece ice scraper is presented with a single straight edge.

In the patent to Thomas (U.S. Pat. No. 4,164,801) is described a variation on the above patent to Hopkins, in which independent flexible fingers are added.

The second patent to Hopkins, et. al. (U.S. Pat. No. 4,275,476) adds a thin webbing in between the flexible fingers.

These patents disclose various types of ice scrapers and the like, but none of them, whether taken singly or in combination, disclose the specific details of the combination of the invention is such a way as to bear upon the claims of the present invention.

SUMMARY OF THE INVENTION

It is an object and feature of the invention to provide a safe, easy, and efficient means to scrape ice, snow, and frost from all windows of an automobile.

Another object, feature and novelty of the invention is to provide an improved means of cleaning curved windshields and side windows with the incorporation of a contoured scraping edge.

Another object of the invention is to provide a means for removing mud, sleet, excess water and other obscuring matter from the windows of an automobile.

Another object and novelty of the invention is to provide a means for removing all of the above obscurants in one convenient and easy to use device.

Another object and novelty of the invention is to provide separate edges for removing frost and ice, so as to facilitate their removal.

Another object of the invention is to allow easy location of the device by means of bright coloration and/or the inclusion of a fabric loop fastener, such as VELCRO, which will attach easily to the carpet of an automobile.

These, together with other objects and advantages of the invention, reside in the details of the design and operation as described and claimed below.

DESCRIPTION OF THE PREFERRED EMBODIMENT OF THE INVENTION

Figure 1:
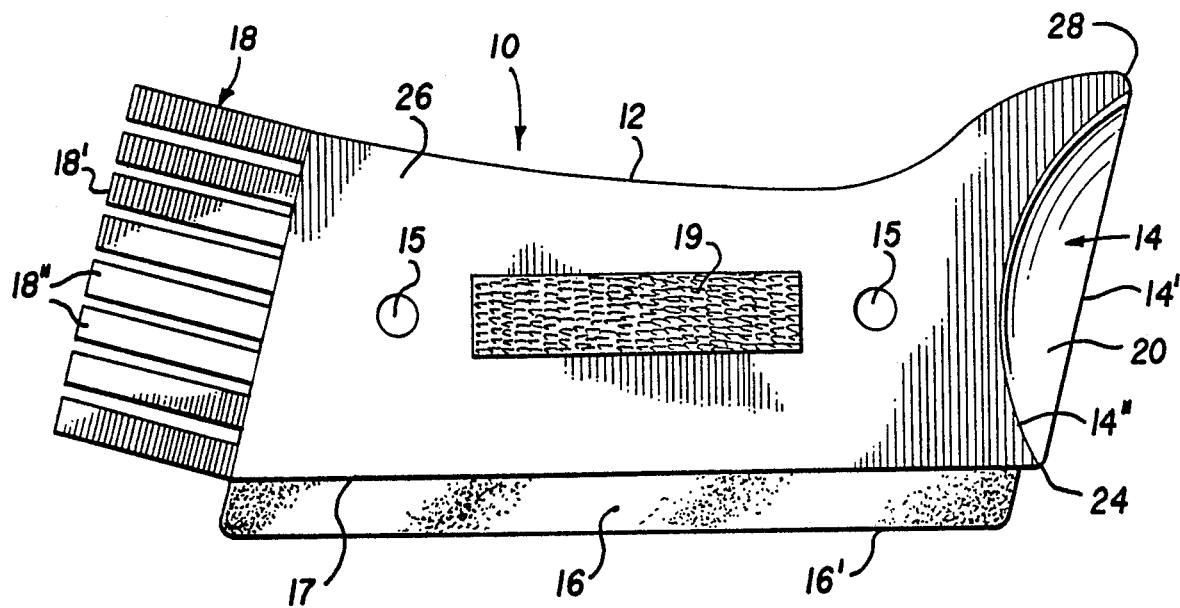
FIG. 1 is a top view of the preferred embodiment of the invention.

Referring now to the drawings, FIG. 1 shows a top view of the preferred embodiment of the invention comprising: a body 10 of one-piece construction of acrylic plastic such as that as manufactured by Warp under the designation FLEX-O-GLAZE, or similar material that is sufficiently strong, durable and comfortable to the touch at low temperatures. A squeegee attachment 16 extends from a long, straight side edge 17 of the body. The body 10 includes four functional regions: a contoured frost scraper 14 at one end; a contoured ice and snow scraper 18 at an opposite end; a lateral gripping edge 12; and the squeegee attachment 16 on the opposite lateral edge, the latter of which may also be used as a gripping edge.

The squeegee attachment 16 may be made from a soft rubber or similar material that will not become brittle or inflexible in freezing conditions. As seen from the top view of FIG. 1, the contoured frost scraper 14, the contoured ice and snow scraper 18, and the squeegee attachment 16 are provided with straight edges 14', 18', 16', respectively. The edges 14' and 18' are angled with respect to the side edge 17 so as to achieve an optimum length for each. This disposition also achieves a partial slicing action as either the rigid scraper 14 or slightly yieldable fingered scraper 18 is utilized. The angular disposition is achieved by maintaining an obtuse angle (a) between the contoured frost scraper 14 and the squeegee attachment 16, and an acute angle (b) between the contoured ice and snow scraper 18 and the side edge 17. The gripping edge 12 is concavely curved to better fit the shape of the hand when holding the invention from that side. One or more portions of the body, preferably at least near the contoured frost scraper 14, may include a hole 15 for use in hanging and storing the scraper 10.

As a further enhancement of the invention, a fabric loop fastening material 19, constructed of a material such as VELCRO or a similar fastener, may be affixed to the body to allow the scraper 10 to be attached to the carpet material of an automobile.

Figure 2:
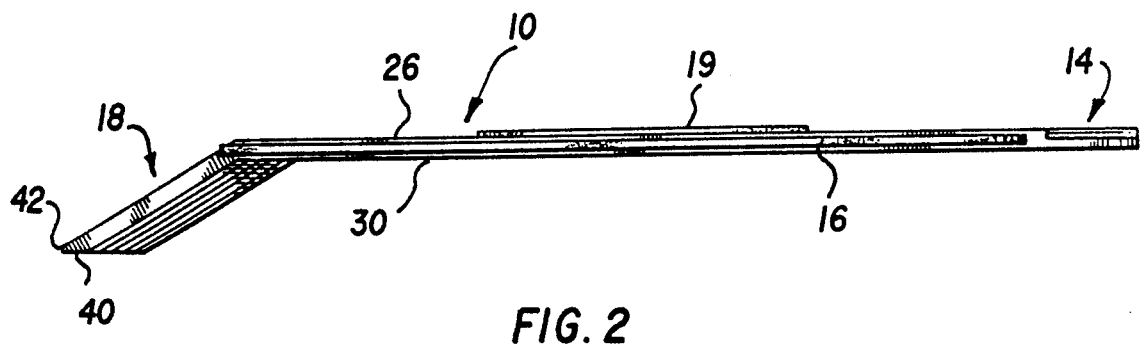
FIG. 2 is a side elevation of the contoured frost scraping edge of the invention.
Figure 4:
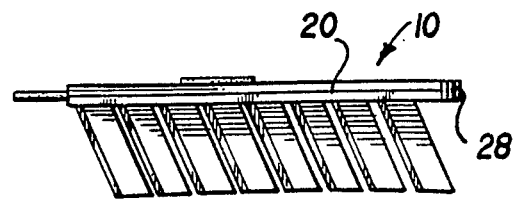
FIG. 4 is a right-end view of the device shown in FIG. 2.

FIGS. 1, 2 and 4 most clearly illustrate the beveled frost surface 20 and rounded safety corners 24, 28. The flat frost scraping edge 14' extends perpendicularly from the base 30 and top 26 of the invention. The rearmost contoured frost scraping edge 14" is curved so as to form the concave surface 20 with respect to the flat, frost-scraping edge 14'. The beveled frost surface 20 is inclined between the top surface 26 of the invention 10 and the front scraping face 14' so as to allow ease of use when operating the invention with the contoured frost scraping edge 14". In operation the user would apply the flat, frost-scraping edge 14' to the windshield so as to form an acute angle between the flat, frost-scraping edge and the windshield and then scrape in a back and forth manner for the removal of frost. To do the same with curved side windows, the user would apply the contoured frost scraping edge in a similar manner.

The squeegee on one side 17 of the body 10 of the invention, connecting the contoured frost scraper 14 and the contoured ice and snow scraper 18, comprises a straight edge which may be applied to windows for the removal of excess water, sleet, loose snow, mud, or similar obscurants. In another embodiment of the invention this feature may be omitted and replaced with a curved the gripping edge similar to the gripping edge 12.

Figure 3:
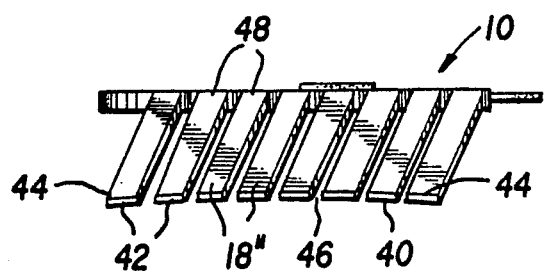
FIG. 3 is a left-end view of the device shown in FIG. 2.

FIG. 3 shows an end view of the contoured ice and snow scraper 18, located at the other end of the body from the contoured frost scraper 14. The contoured ice and snow scraper comprises a series of flexible, contoured fingers or projections 18" angularly extending downwardly and away from the body base 30. The bottom edges 40 of these projections 18" are straight and colinear, while the front faces 42 are flat, coplanar, and perpendicular to the base 30. The top edges 44 of the projections 42 form a concave contour similar to the contoured, frost-scraping edge 14". Extending from each of the top edges 44 to the top surface 26 is a beveled ice face 48, serving a similar purpose to the beveled frost face 20. The contoured projections 18" define a series of thin grooves 46 which may vary in length and curvature. The finger 18" nearest the gripping edge 12 will be seen to be curved to conform to the shape of the gripping edge 12.

In operation the user would apply the bottom edges 40 to the windshield so as to form an acute angle between the windshield and the bottom edges 40 and then scrape in a back and forth manner for the removal of ice and snow. To do the same with the curved side windows, the user would apply the top edges 44 in a similar manner.

In the preferred embodiment of the invention, the body is made in fluorescent or similarly bright colors so as to be easily seen in dim light and easily distinguished from other items in the automobile.

The foregoing is considered as illustrative only of the principles of the invention. Further since numerous modifications and changes will readily occur to those skilled in the art, it is not desired to limit the invention to the exact construction and operation shown and described, and accordingly, all suitable modifications, and equivalents which may be resorted to, fall within the scope of the invention.

What is claimed is:

1. An apparatus for scraping ice, snow, and frost from the windows of automobiles comprising:
    a one-piece body having a hand gripping edge along one side,
    a fixed frost scraping edge at one end of said body, displaceable frost and ice scraping means at an opposite end of said body,
    liquid removal means on an edge of said body opposite said hand gripping edge,
    and means on said body to permit fixed storage of said apparatus.

2. The apparatus of claim 1, wherein the one-piece body is made from an acrylic plastics material.

3. The apparatus of claim 1, wherein said hand gripping edge comprises a concavely curved side on said one-piece body.

4. The apparatus of claim 1, wherein said fixed frost edge comprises;
    a straight frost scraping edge for removing frost from flat surfaces,
    a contoured frost scraping edge rearward of said straight edge for removing frost from curved surfaces,
    a beveled frost surface intermediate said straight and contoured edges,
    and round corners bounding said fixed frost scraping edge.

5. The apparatus of claim 1, wherein said displacealbe scraping means includes a plurality of yieldable projections.

6. The apparatus of claim 5, wherein said projections are laterally spaced apart and angularly offset from the plane of said body.

7. The apparatus of claim 1, wherein said one-piece body is fluorescent so as to be easily locatable in dim or obscured lighting.

8. The apparatus of claim 1, wherein said liquid removal means comprises a longitudinal extending squeegee.

9. The apparatus of claim 1, wherein said scraping edge and scraping means are disposed at angles other than normal to said edge having said liquid removal means.

* * * * *